United States Patent
Aebersold (10) Patent No.: US 9,575,614 B1
(45) Date of Patent: Feb. 21, 2017

(54) INTEGRATED CONTENT DISPLAY SYSTEM AND METHOD

(75) Inventor: Andrew N Aebersold, Louisville, KY (US)

(73) Assignee: Andrew Aebersold, Floyd Knobs, IN (US)

( * ) Notice: Subject to any disclaimer, the term of this patent is extended or adjusted under 35 U.S.C. 154(b) by 938 days.

(21) Appl. No.: 12/418,073

(22) Filed: Apr. 3, 2009

Related U.S. Application Data (60) Provisional application No. 61/042,500, filed on Apr. 4, 2008.

(51) Int. Cl.
*G06F 3/048* (2013.01)

(52) U.S. Cl.
CPC ...................... *G06F 3/048* (2013.01)

(58) Field of Classification Search
USPC ......................... 715/713, 760, 825
See application file for complete search history.

(56) References Cited

U.S. PATENT DOCUMENTS

| | | | |
|---|---|---|---|
| 5,404,316 A * | 4/1995 | Klingler et al. | 715/723 |
| 2004/0010753 A1* | 1/2004 | Salter et al. | 715/513 |
| 2004/0123238 A1* | 6/2004 | Hefetz et al. | 715/513 |
| 2004/0148318 A1* | 7/2004 | Taylor et al. | 707/203 |
| 2004/0158499 A1* | 8/2004 | Dev et al. | 705/26 |
| 2005/0021407 A1* | 1/2005 | Kargman | 705/15 |
| 2006/0235755 A1* | 10/2006 | Mueller et al. | 705/15 |
| 2008/0040322 A1* | 2/2008 | Rucker et al. | 707/3 |
| 2008/0141155 A1* | 6/2008 | Wierowski et al. | G06F 3/0482 715/769 |

* cited by examiner

*Primary Examiner* — Peiyong Weng (57) ABSTRACT

The invention comprises a web-based digital menu board content creation and management system that permits rapid and simple production of customized electronic digital displays from a plurality of configurable, dynamic templates. Playback of the content is readily facilitated through a content player that enables dynamic content updating and tracking of content display periods for purposes of advertising data collection.

11 Claims, 11 Drawing Sheets

INTEGRATED CONTENT DISPLAY SYSTEM AND METHOD

BACKGROUND OF THE INVENTION

Field of the Invention

The present invention relates generally to a system for electronic display of content and more specifically to a web-based digital menu board content management system that permits rapid and simple production of customized electronic digital displays from a plurality of configurable dynamic templates. Playback of the content is readily facilitated through a content player that enables dynamic content updating and tracking of content display periods for purposes of advertising data collection Description of the Related Art Many prior art systems for creating and displaying content such as advertising, product information, video, and other types of digital media are presently commercially available for displaying digital content on a video screen, or even a plurality thereof. Typically, content may be programmed in a flash file for playback in one of many conventional content players, such as Windows Media®, Internet Explorer®, or any variation of Microsoft® ActiveX player. However, nearly all prior art systems require a user to be skilled in manipulation of digital content and video display, as well as being able to prepare the content of the media being played back.

Accordingly, preparing even a simple video advertising or marketing display for viewing in, for example, a store to attract customers and inform them of product offerings often requires the effort of multiple skilled personnel, from advertising and marketing executives, to graphical designers, to computer programmers. As can be readily seen, there is a need in the art for a system for creating and displaying content, for example audio and video, that is readily utilized by personnel with little or no training in the aforementioned fields. Such a system should be readily configurable and permit a plurality of content displays to be configured by a single user or administrator.

SUMMARY OF THE INVENTION

The present invention provides a digital menu board content management system that includes a visual template editor for producing a plurality of electronic customizable templates on which content may be placed. A content editor is also provided, which permits a user to choose a plurality of templates or panels and populate them with assets stored in a library for display. Additionally, a content player is provided that utilizes JavaScript code in conjunction with a Google Gears™ plug-in that provides for real-time content playback and dynamic content updating.

The invention provides a web-based application that permits creating, customizing and modifying digital signage and displays with a minimum of effort. The visual template editor permits a user or administrator to produce an electronic display template, or a plurality thereof, that define the overall size of the electronic display, various display parameters, resolution of images, display colors and borders, and even zone-specific content where a defined area of a template may be configured for video files, while another defined area may be configured for other types of dynamic content. Each template may comprise a plurality of containers, which are placeholders for image content, animation content, zoned content and the equivalent, and act to dynamically size content that is dragged and dropped into each container. Once a template is produced, it may be saved and populated with a variety of differing content options.

A digital content editor provides a user with the ability to access a variety of assets or visual image files and drag and drop them onto the customized templates to produce digital electronic display panels. Assets or parts can be saved and managed in a parts library that is accessed through the content editor. Parts may be readily imported to panels using drag and drop techniques, and are automatically scaled to the size in their respective containers within each template.

A content player may also be included in the present invention to play the created panels that permits a user to point a playback device to a customer specific URL and display their created panels and the content included therein in real-time. The content player will automatically check for updates to the panels and populate new content therein as required. Additionally, where the communications between the system and the content player is lost, or when electrical power to the system is lost, the content player may be configured to cache the current content and continue displaying it until the communications are restored.

Other features, object and advantages of the present invention will become apparent from the detailed description of the preferred embodiment(s) taken in conjunction with the drawing Figures.

DETAILED DESCRIPTION OF THE PREFERRED EMBODIMENT(S)

Figure 1:
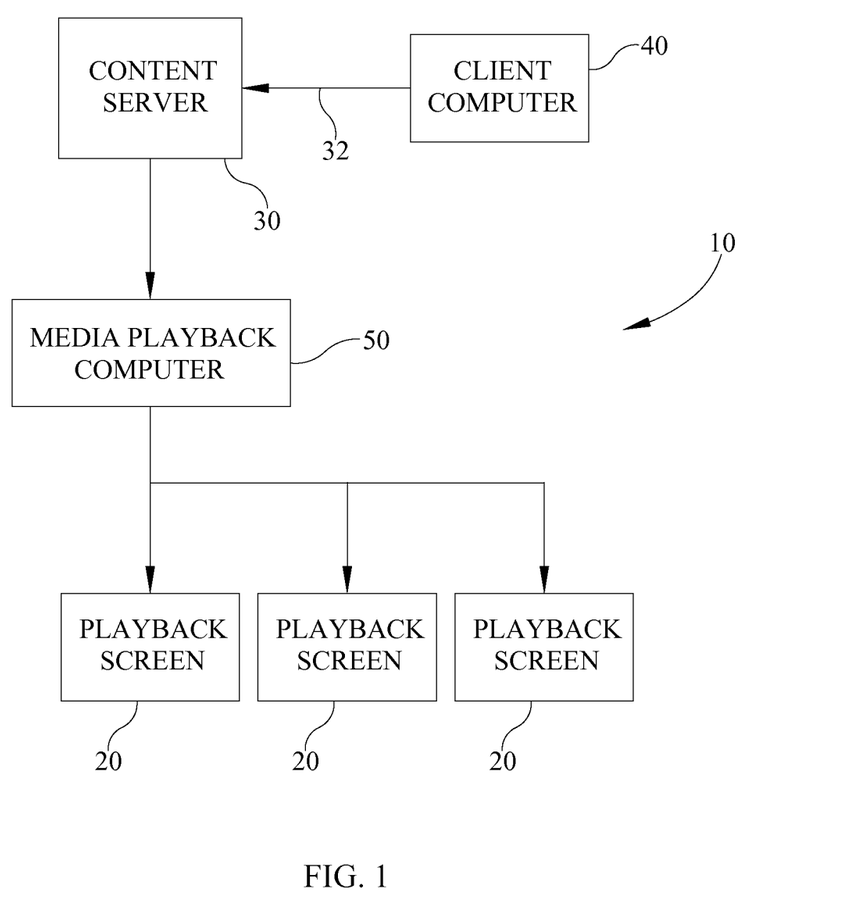
FIG. 1 is a block diagram of a content creation computer network in accordance with one embodiment of the present invention.

Referring now to FIG. 1, and in accordance with a preferred constructed embodiment of the present invention, a system 10 for creating and displaying digital image content comprises an electronic video display 20, or a plurality thereof, and utilizes an administrative content server 30 to create said content. As used in this specification the term content may include any image or audio that is capable of being stored in an electronic format, for example digital images or video files with or without associated audio components.

The system 10 of the invention employs content server 10 to administer and run a content creation and display program that may be accessed through conventional computer network communications 32 by a client computer 40, and which further provides created content to be displayed in a predetermined format to a media playback computer 50. A content server 30 may comprise a commercially available server having a microprocessor and concomitant memory in which suitable programming instructions may be executed. Similarly, media playback computer 50 may also comprise a processor and concomitant data memory.

Figure 2:
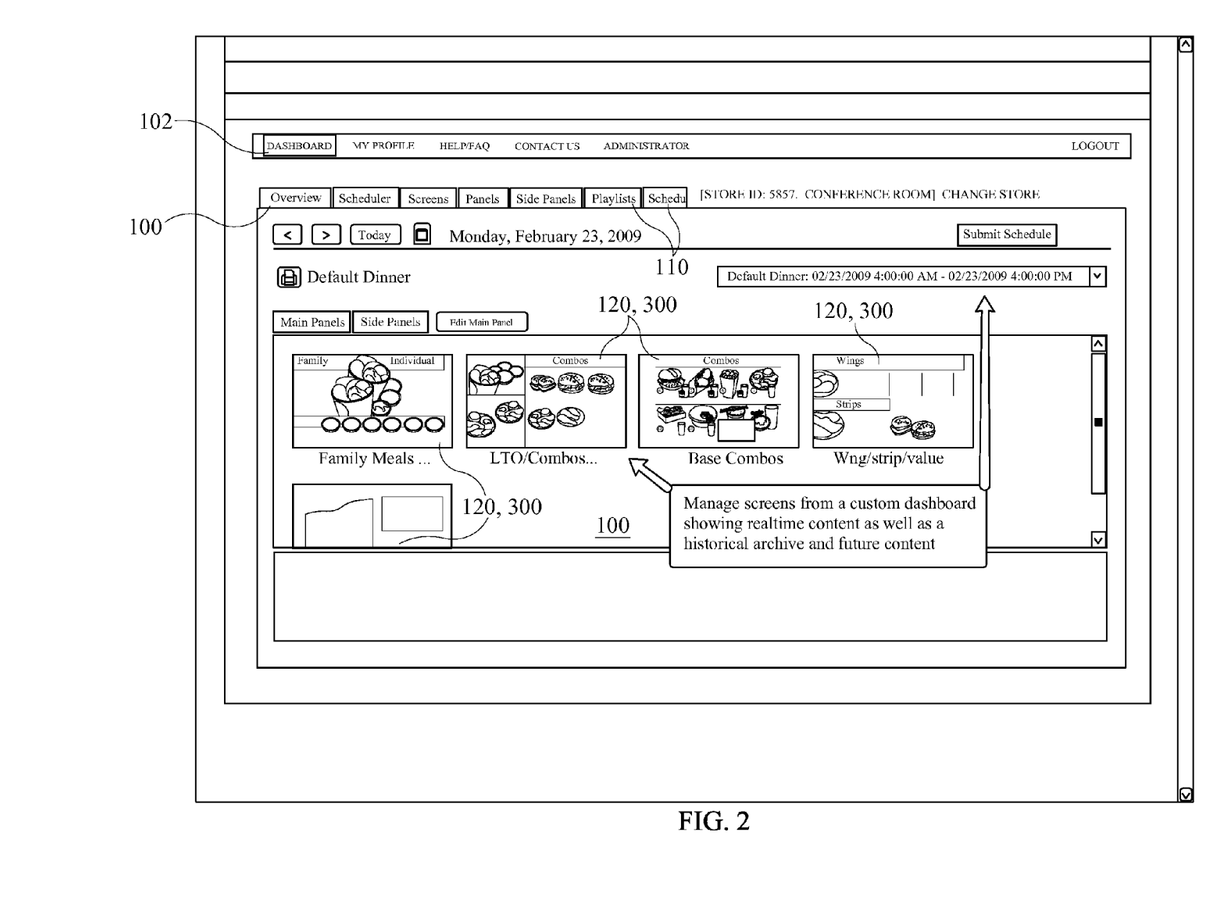
FIG. 2 is an exemplary screen layout for a digital content display system in accordance with one embodiment of the present invention.

System 10 comprises a visual template editor 100, shown in FIG. 2 as a dashboard 102 that may be accessed by a user through a conventional user interface of said client computer 40, for example a keyboard and mouse. Dashboard 102 provides a series of menus 110 through which visual template editor 100 may be manipulated. It should be noted that the various editors referred to in this specification may be created by conventional programming techniques using a wide array of software tools. In one embodiment of the invention the editors may be created utilizing Adobe Flex™ and compiled as Flash files for display in a graphical user interface (GUI). Additionally, one of ordinary skill in the art will recognize that an endless variety of content may be created and displayed utilizing the system 10 of the present invention. In an exemplary description, the invention disclosed herein will be described in the context of fast food store or kiosk advertising, wherein the content of the material being displayed may be dependent upon multiple factors such as store location, time of day, and special promotional events. However, this example is in no way limiting of the type of content that may be created utilizing system 10, and is not limiting of the claimed invention.

Visual template editor 100 may comprise a "what-you-see-is-what-you-get (hereinafter "WSIWYG") editor that enables a user to construct a plurality of visual display templates 120. Once created, templates 120 may be used repeatedly to produce display panels, as will be discussed further herein below. Visual template editor 100 permits a user to create a template 120 that may be compiled as a Flash file, that determines the overall content layout that is both scalable and coordinate based to accommodate any display 20. Template editor 100 enables a user to specify the size and location of a plurality of "containers" 140 within each template as insert a background image (which may be an image, Flash file, or video) to be run during playback. Each container 140 may define a space on which an image or text is arranged and also include a plurality of attributes that specify the exact appearance and functionality of the container 140 within template 120.

Figure 3:
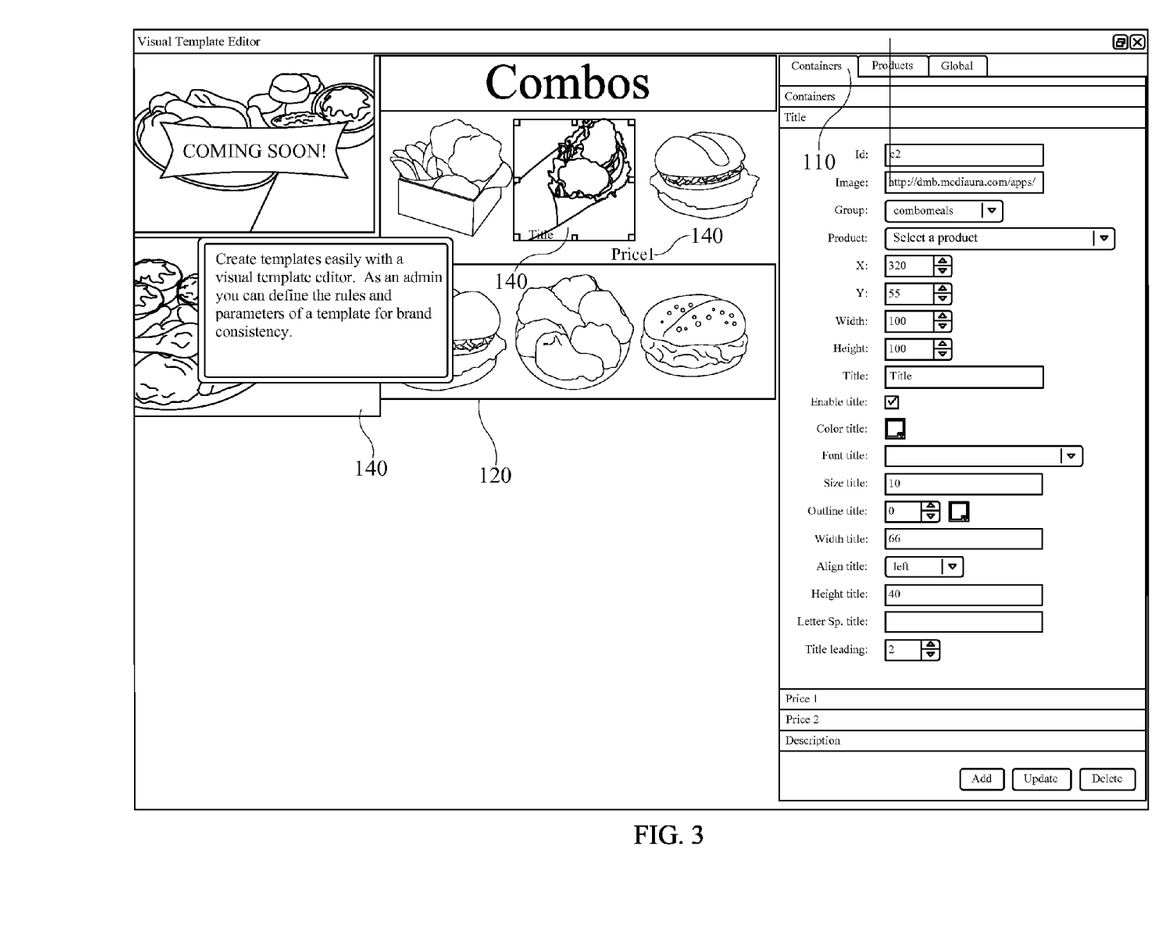
FIG. 3 is an exemplary screen layout for a digital content display system in accordance with one embodiment of the present invention.

As shown in FIG. 3 template editor 100 includes a menu 110 entitled "Containers" that provides a user with a menu selection of attributes 142 for each container 140 placed in template 120. Attributes for containers 140 include, but are not limited to: a unique alphanumeric identification, a dynamic title, a dynamic price, a description, a language selection, font type, size and color, outline or dropshadow display modes, kerning, letting, size, coordinate location within template 120, product categories, and name. Thus a user may select each of these attributes for each container 140 placed in template 120. In one embodiment of the Invention, containers may be placed in template 120 using drag and drop techniques, thereby enabling rapid construction of templates 120.

Figure 4:
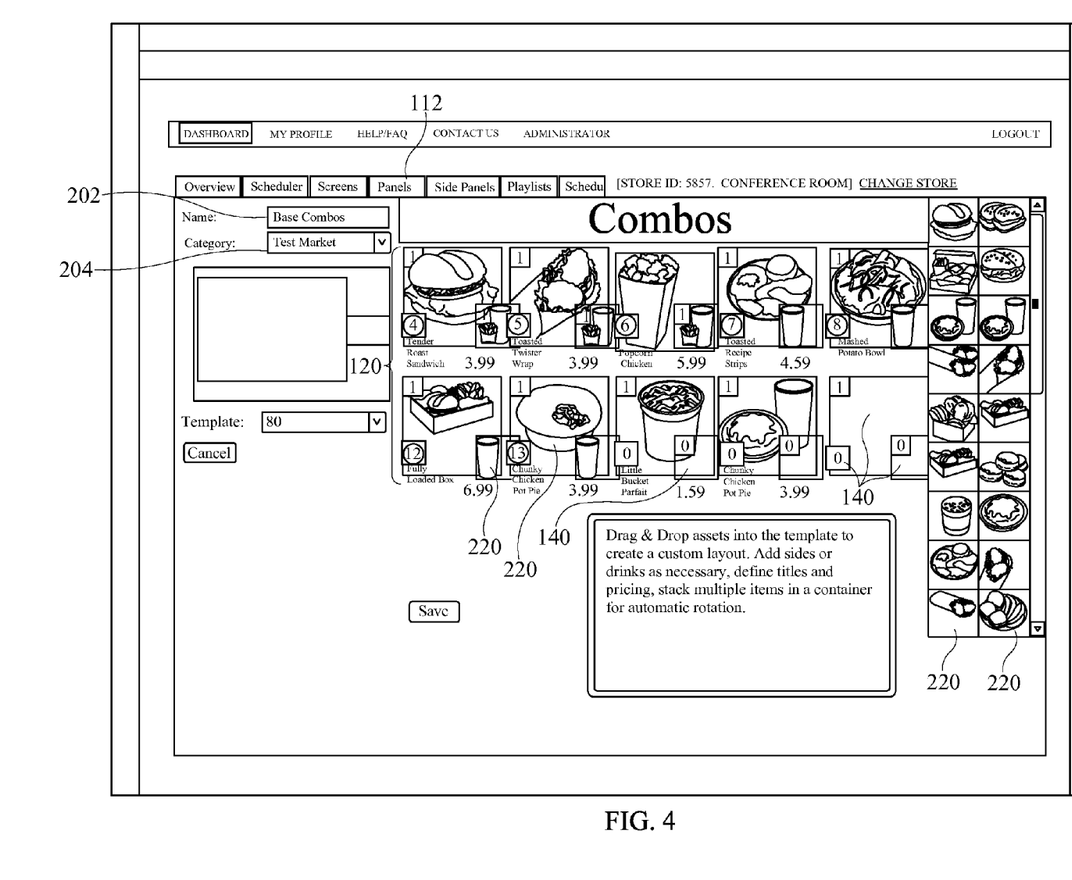
FIG. 4 is an exemplary screen layout for a digital content display system in accordance with one embodiment of the present invention.

Once constructed, each individual template 120 may be saved as a Flash file, and accessed by a visual content editor 200, as best seen in FIG. 4, which depicts a completed and saved template 120 having a plurality of containers 140 located on the visual space defined by template 120, onto which a plurality of assets 200 are being arranged. Content editor 200 may also comprise a WYSIWYG editor, similar to that of the visual editor 100. A "Panels" menu 112 provides user access to a portion of the functionality within content editor 200. Panels menu 112 permits a user to select one of a plurality of saved templates 120 listed by name and category in pull-down tabs 202 and 204 respectively. Assets 220 which may be selected by mouse and placed via drag-and-drop into containers 140 are displayed in an assets menu 230, located on the right side of panels menu 112.

When template 120 is selected by a user only those assets 200 that will conform the to attributes selected for the container 140 that is specified in that template 120 location will appear in assets menu 230. Accordingly, system 10 will not permit a user to place an asset 220 within a container 140 which is designed for a different asset 200 type. For example, if a user clicks on a title container 140 in template 120, system 10 will not permit an image asset to be placed in that container 140. However, title text may be placed or typed therein. Additionally, multiple assets 200 may be "stacked" within a single container 140 such that, when displayed, the assets are automatically displayed in sequence on video displays 20 in that individual container 140. Furthermore, the time each asset is sequentially displayed may be specified during the template 120 creation process, thereby providing a highly customizable and dynamic product display that is extremely user-friendly.

Figure 5:
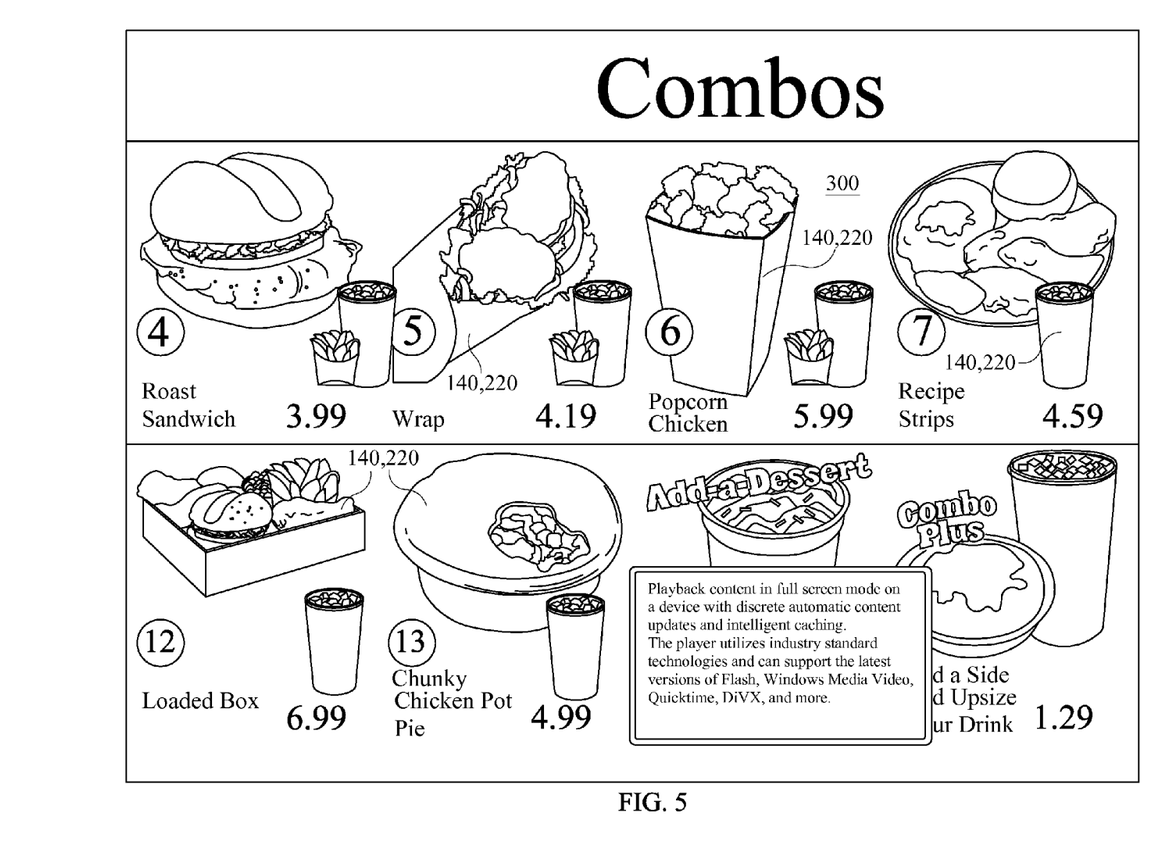
FIG. 5 is an exemplary screen layout for a digital content display system in accordance with one embodiment of the present invention.

FIG. 5 depicts an exemplary completed display panel 300, which is produced by populating all containers 140 located on template 120 with a plurality of assets 220. For purposes of this specification a display panel 300 may be defined as a template 140 having content placed therein and capable of display on video displays 20. FIG. 5 includes a plurality of containers 140, each having an asset (or a plurality of stacked assets) associated therewith, which may be provided to a display 20.

Figure 6:
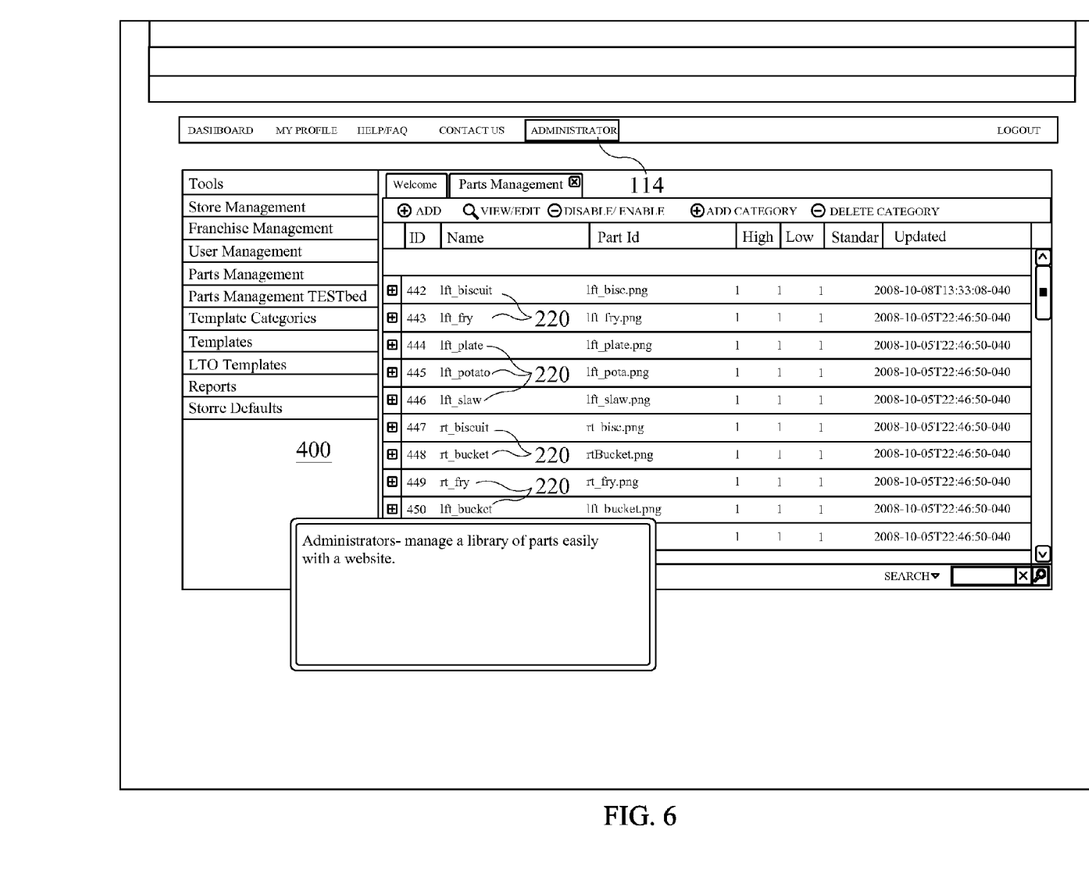
FIG. 6 is an exemplary screen layout for a digital content display system in accordance with one embodiment of the present invention.

Assets 220 may comprise a wide variety of audio and video file formats, including but not limited to .png files, .swf files, .jpg files, FLV video files, MP3 audio files, BMP files, GIF images, WMV, DiVX, MPEG or almost any widely known image and video format. These assets are stored in an asset or "parts" library 400, located in an administrator menu 114 and depicted in one example of the invention in FIG. 6. The parts library permits an administrative user to create a customized asset 220 library 400 by importing image files as necessary, assigning them file names, and updating, adding, or deleting assets 220 as required for a given product, advertising campaign, or marketing strategy. Furthermore, each "part" or assets 220 may be assigned to a specific template or templates so that assets 220 that do not fit or belong in a given template 120 may be excluded from being used with that template 120.

Figure 7:
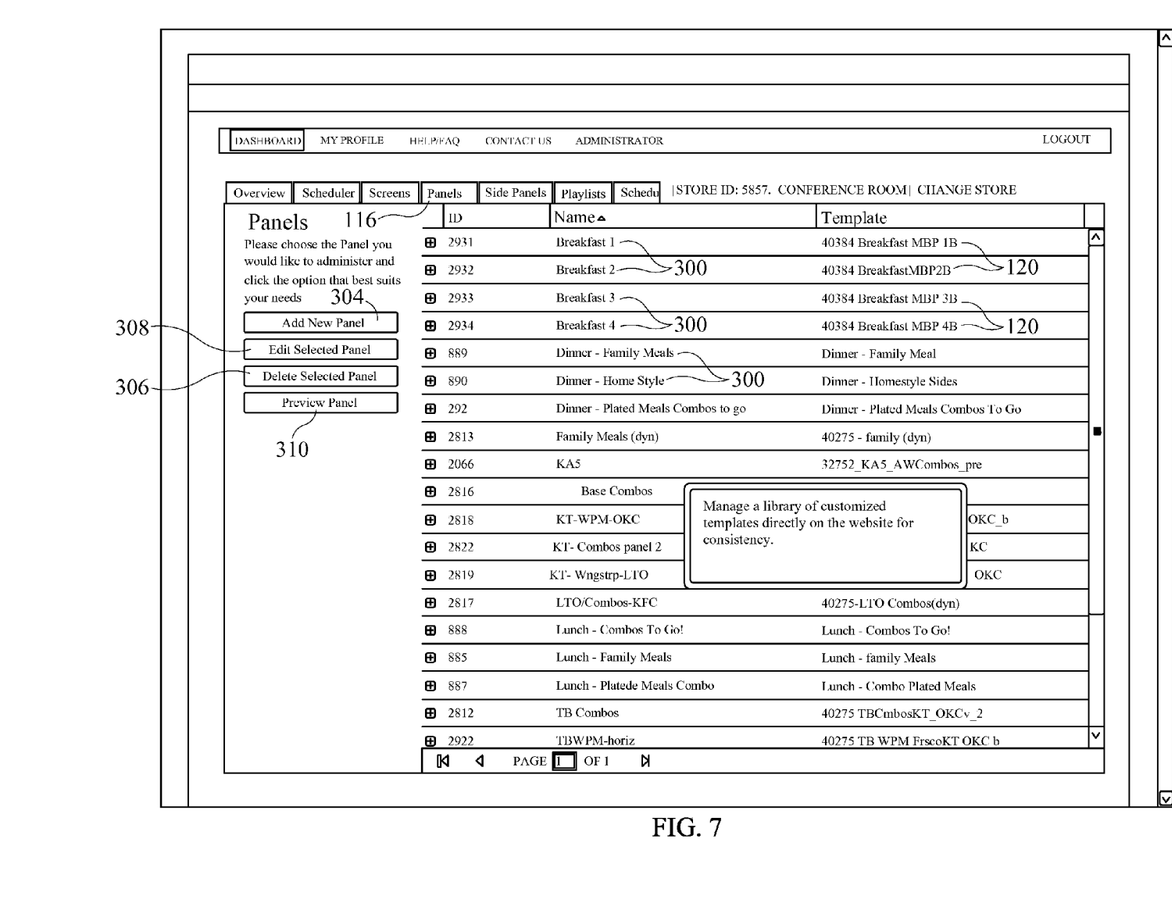
FIG. 7 is an exemplary screen layout for a digital content display system in accordance with one embodiment of the present invention.

Referring now to FIG. 7, completed panels 300 may be saved in a panel/template library 302 that is accessed by a user via the Panels menu 116 within content editor 200. Panel library 302 lists all saved panels 300 by title and unique alphanumeric identification number, and also shows the template 120 file associated with each panel file 300. Thus a user or administrator may access all saved panels 300 from a single menu, add or delete selected panels via add and delete buttons 304 and 306 respectively, edit selected panels with an edit button 308, or preview the exact way a panel 300 will display by selecting the panel and the preview button 310. As can be readily seen, panel library 302 enables a user to quickly and easily select any saved panel 300, and customize it for display with very little effort or programming skill.

Figure 8:
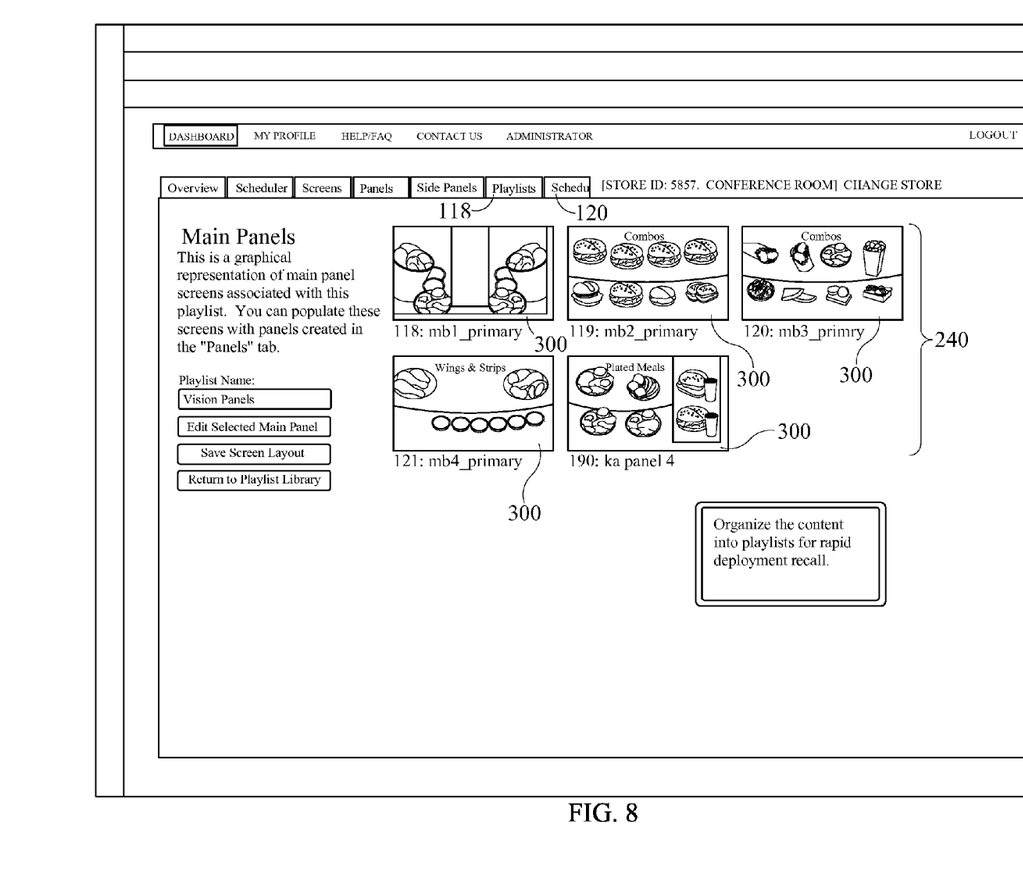
FIG. 8 is an exemplary screen layout for a digital content display system in accordance with one embodiment of the present invention.

Content editor 200 further comprises a Playlist menu 118, as depicted in FIG. 8, which permits a user to create and edit a plurality of playlists 240 for sequencing panels 300 to be viewed on a selected display 20. Each playlist 240 may be assigned a name, for example "Vision panels" as shown in FIG. 8, and all panels 300 to be used or sequenced in the playlist may be arranged on the screen via drag-and-drop. Once a playlist 240 is created by a user, it may be scheduled for playback on video displays 20 by selecting the scheduling menu 120 from content editor 200. Playlists 240 may comprise any number of panels 300 and a duration of display can be specified for each panel 300, after which time it is replaced by the next panel 300 selected in the sequence. This feature of the invention provides a simple graphical method by which a user can define a broad array of content to be cycled through a single display or displays.

Figure 9:
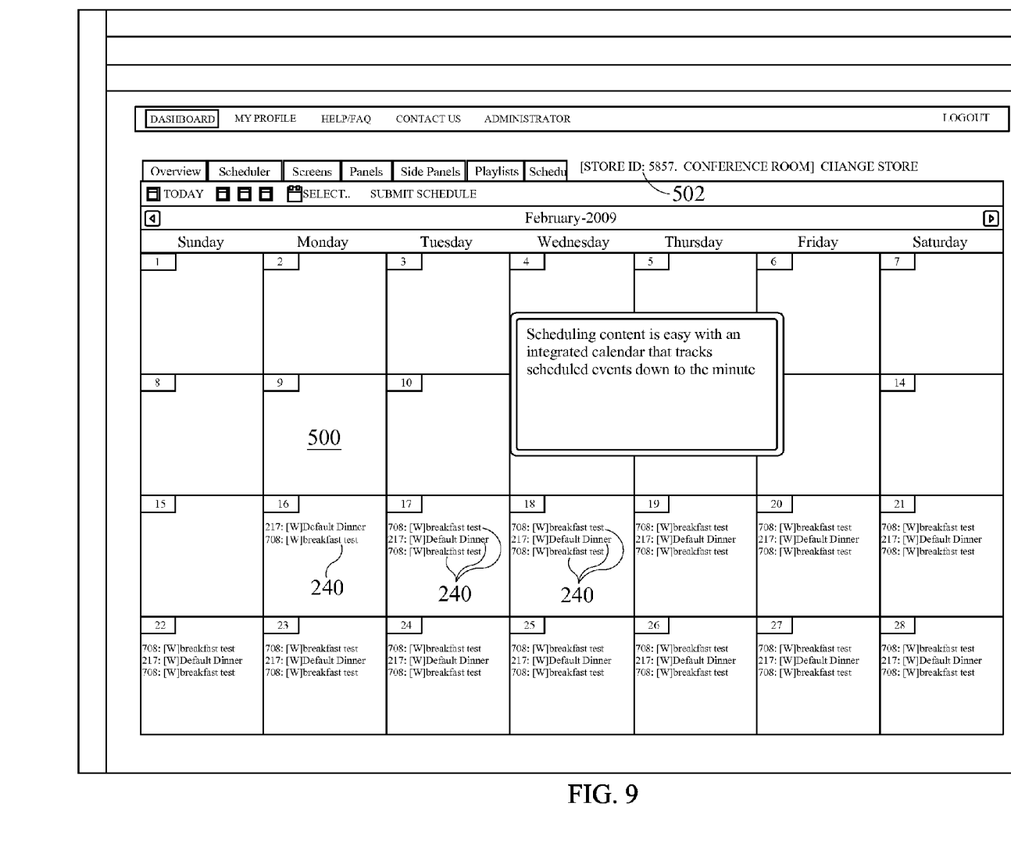
FIG. 9 is an exemplary screen layout for a digital content display system in accordance with one embodiment of the present invention.

As best seen in FIG. 9, a scheduler menu 118 provides a scheduling calendar 500 permitting a user to schedule panels 300 or playlists 240 for playback at specified times, and in specified locations. The user schedules content to be played at an individual location (in this example a store) by selecting or specifying a unique store ID 502 for which a scheduling calendar 500 is displayed. A "change store" icon 504 is provided to permit the user or administrator to select from each store included in system 10. A plurality of playlists 240 may then be placed onto each day of calendar 500 for the specified store or locale, and a play time may also be specified in one of several fashions. Panels 300 or playlists 240 may be specified to run during certain parts of days. For example, in a restaurant setting a breakfast playlist 240 may be scheduled to be displayed in the morning, a lunch playlist 240 may be displayed after 11:00 am, and a dinner playlist 500 may be displayed after 3:00 pm. The appropriate playlist 240 can be displayed automatically on selected displays 20 depending upon the time of day. Additionally, calendar 500 enables a user to schedule recurring events or playlists 240 by simply placing the events on calendar 500 that is associated with unique store ID 502. This feature of the invention enables a user to rapidly and easily create store displays by simply placing playlists 240 on calendar 500, and specifying times within the calendar day that the playlists 240 are to be displayed.

As can be seen from the above, a single user or administrator may control and schedule content of a plurality of stores from the same menus by simply selecting the store or stores, by unique ID, that are being scheduled. Furthermore, a user can edit or update a plurality of different store calendars 500 or playlists 240 and update all of them at a single time, rather than updating them piecemeal.

Figure 10:
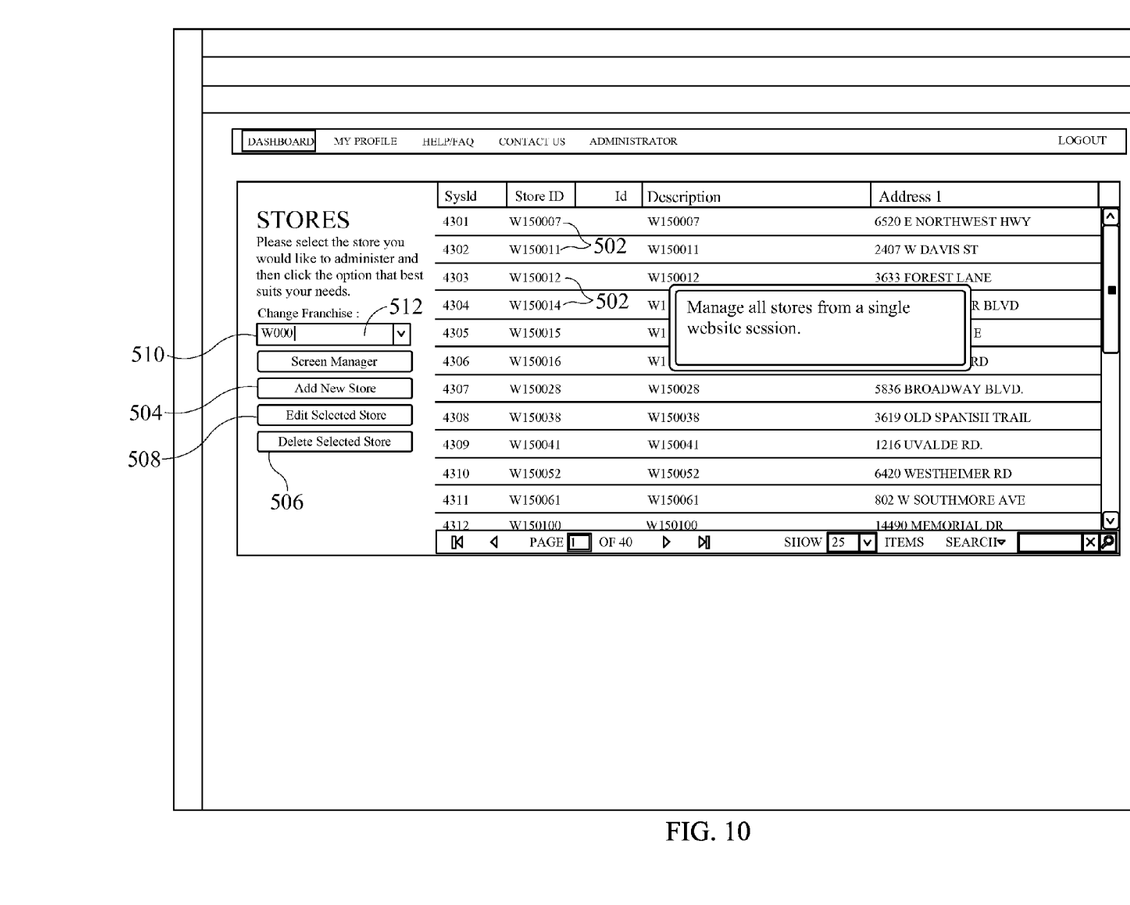
FIG. 10 is an exemplary screen layout for a digital content display system in accordance with one embodiment of the present invention.

FIG. 10 depicts a "Stores" menu 520 that permits an administrator or user to have access to all stores (locales) within system 10. An add store button 504 enables a user to create new stores, while a delete button 506 permits removal of stores or locales from system 10. Additionally, individual stores' information may be edited using the edit button 508. The screen manager button 510 permits a user to include additional displays 20 for a specific store ID, so that content may be provided to all displays 20 within a given store, and further so that individual displays 20 may be easily added to or removed from system 10. Additionally, in an alternative embodiment of the invention, a plurality of stores or locales can be associated with an individual franchise, such that a single user can manage a plurality of franchises using a single web-based system. A franchise identifier tab 512 is provided that enables a user to select from a list of franchises, thereby enabling the management of display content to a vast array of stores. This feature of the invention is particularly useful, for example, in the fast food industry where a national advertising campaign or marketing plan must be enacted across a plurality of franchisees, each acting in an individual capacity. The system 10 permits a user to create and control content being displayed in hundreds or even thousands of stores and franchises by simply selecting and editing as described herein above.

Figure 11:
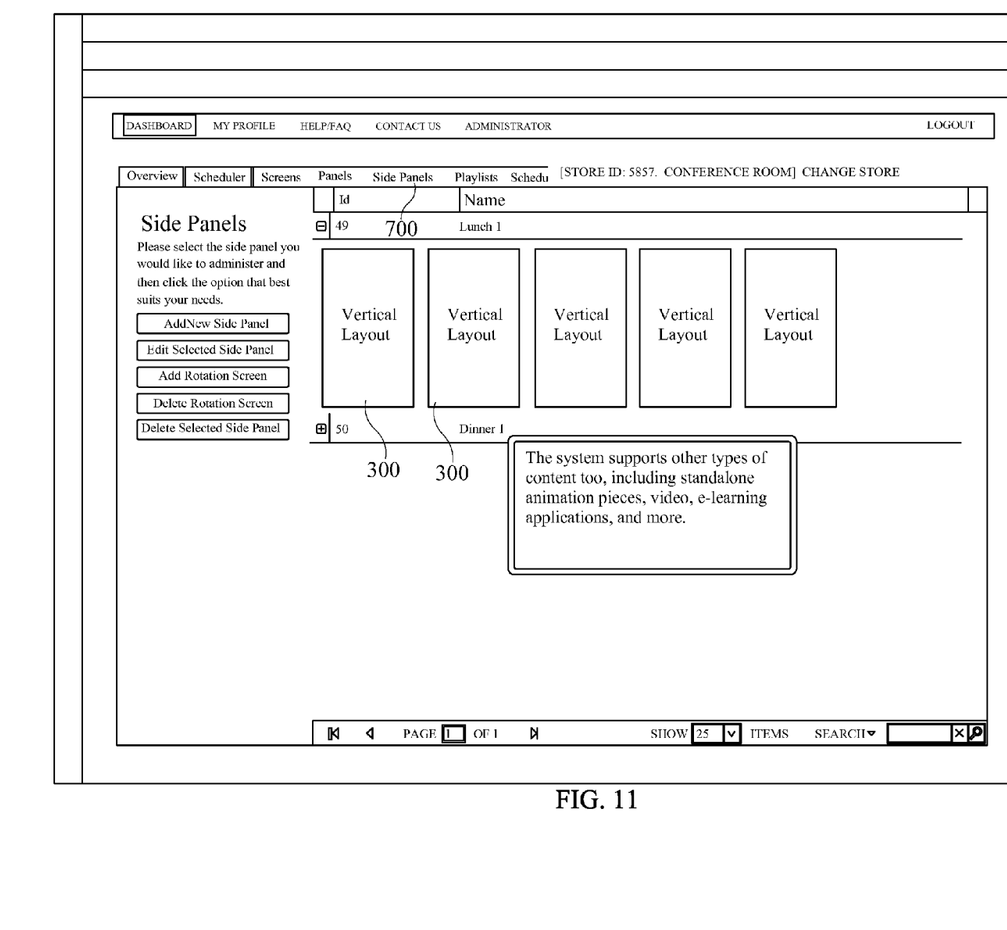
FIG. 11 is an exemplary screen layout for a digital content display system in accordance with one embodiment of the present invention.

In a yet further embodiment of the invention, the system 10 provides a user the ability to import content that is not created using system 10 for display through use of a "Side panel" menu 700, as best seen in FIG. 11. The Side panel menu 700 permits a user to add content, saved as panels 300, that may comprise different types of content such as stand-alone animation files, videos, e-learning applications etc. Furthermore, the Side panel menu 700 supports the use of touch screens so that a store may add a touch computing surface that can be provided with real-time feedback from content server 30. Once these files are saved as side panels, they may be inserted into store playlists 240 and scheduled for display just as with any other panel 300 created by system 10.

Additionally, it should be noted that the system of the present invention permits a user to track display times for individual panels 300 and stores by saving an historical record (as an electronic data file) of the time and duration of display of each panel 300, categorized by store ID. This feature of the invention permits users to calculate costs or royalties for the use of content, as well as providing data for the analysis of the effectiveness of content being displayed at certain locales, and at predetermined times.

In one embodiment of the invention, media playback computer 50 is provided with the content applicable to the store calendar 500 for that specific store (or locale). Accordingly, the system 10 provides the playlist 240 content associated with that specific store, on that specific day, at that specific time, and streams the content to media play back computer 50, where it is accordingly provided to displays 20. In this fashion, any time that updates or revisions are made to the content being supplied to a store, that store is immediately and dynamically updated to reflect the revisions. enables In another embodiment of the invention, system 10 comprises a content player for displaying panel content, rather than utilizing one of many commercially available content players. The content player associated with system 10 utilizes customized JavaScript code in conjunction with code written for Google® Gears plug-in resident in server 30 to permit a user to provide a unique URL to their playback device to access and display their content in real-time. The use of this custom content player enables system 10 to update content and dynamically revise displays during playback. Additionally, the content player caches current content being displayed by each display 20 so that in the event of power failure it automatically displays the most recent content even where internet communications have been disrupted. Additionally, if a screen display 20 is known to be offline or non-responsive, the content player can be configured to automatically rotate the content supplied to the non-functioning screen with that of another display 20, switching between the two content sets at regular intervals, until the malfunctioning display 20 is repaired.

In an exemplary embodiment of the invention, server 30 will run on a standard LAMP system arrangement (LAMP=Linux Apache mySQL PH). Furthermore client computer 40 utilizes a modern web browser (eg., IE7, Firefox, Safari) with a Flash plug-in installed. The media playback device 50 may also employ a modern web browser and can function with any operating system with the Google Gears plug-in and Flash plug-in enabled.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A method for creating content and-for displaying said content on a video device through a media playback computer having a graphical user interface comprising the steps of:
    providing a visual template editor comprising a what-you-see-is-what-you-get editor for producing a plurality of dynamic templates having a plurality of containers defined therein;
    providing a library of templates, a library of panels, and a plurality of dynamically configurable asset files stored in a parts library said parts library comprising a plurality of image and audio files;
    providing a content editor comprising a what-you-see-is-what-you-get editor for selecting at least one of said dynamic templates and populating said containers therein with a plurality of said asset files selected from said parts library, thereby producing a dynamic panel for display on said video device, said panel sequentially displaying said asset files; and
    displaying said panel in real-time on said graphical user interface.

2. A method for creating content for display on a video device as claimed in claim 1 comprising the step of:
    providing a visual template editor for producing a plurality of dynamic flash templates comprising a plurality of containers, each of said containers having a plurality of attributes assigned thereto.

3. A method for creating content for display on a video device as claimed in claim 2 wherein said container attributes include a dynamic title, dynamic price, description, font type, font size, font color, outline/dropshadow, kerning, letting, background image, coordinate location on said template; and a unique identification.

4. A method for creating content for display on a video device as claimed in claim 1 comprising the step of:
    placing said image and audio files in said containers using drag-and-drop editing.

5. A method for creating content for display on a video device as claimed in claim 1 comprising the step of:
    providing a playlist library wherein a plurality of panels may be selected from said playlist library in a predetermined sequence for viewing on said video device.

6. A method for creating content for display on a video device as claimed in claim 1 comprising the steps of:
    providing a store menu having a plurality of stores listed by unique identification code; and
    selecting a plurality of panels for display in a specified store location.

7. A method for creating content for display on a video device as claimed in claim 6 comprising the steps of:
    providing a scheduler menu having a scheduling calendar; and
    scheduling a plurality of predetermined panel displays for display in an individual store.

8. A method for creating content for display on a video device as claimed in claim 7 comprising the steps of:
    providing a scheduler menu having a recurring schedule function; and
    selecting a plurality of recurring panel displays for a plurality of individual stores.

9. A method for creating content for display on a video device as claimed in claim 7 comprising the step of:
    providing a scheduler menu having an historical record of each panel displayed for each individual store.

10. A method for creating content for display on a video device content creation and display system as claimed in claim 7 comprising the steps of:
    providing a scheduler menu having a calendar for each individual store; and
    scheduling selected panels for display in said store by dragging said panels into a specified day on said calendar.

11. A method for creating content for display on a video device as claimed in claim 1 comprising the steps of:
    providing a content player for providing panel displays to a plurality of video devices; and
    dynamically updating said panel displays when said panels are modified in said content editor.

* * * * *